Aug. 31, 1954      J. SKURKA      2,687,975
METHOD OF LUTING THREADS
Filed March 15, 1949
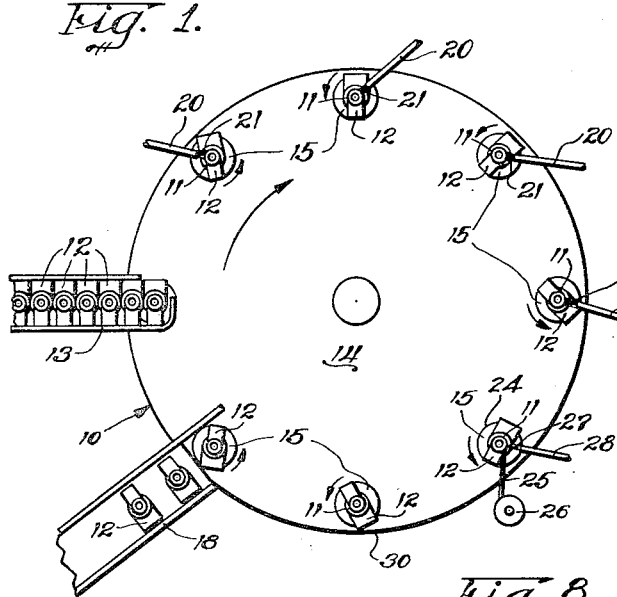
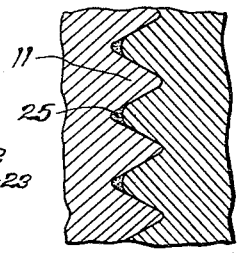
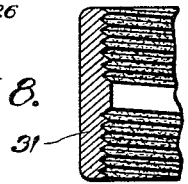
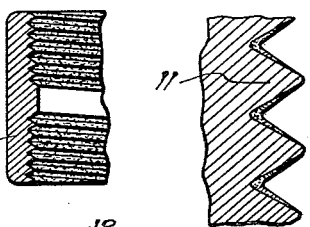
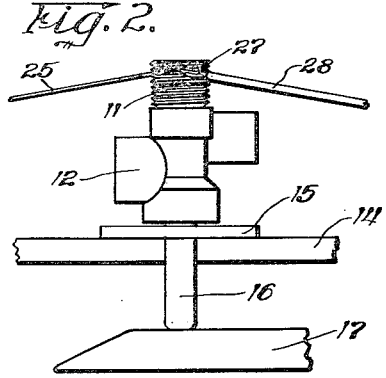
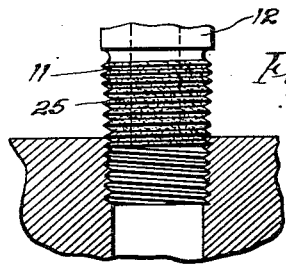
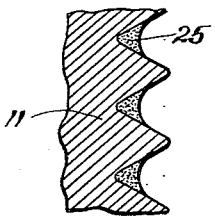
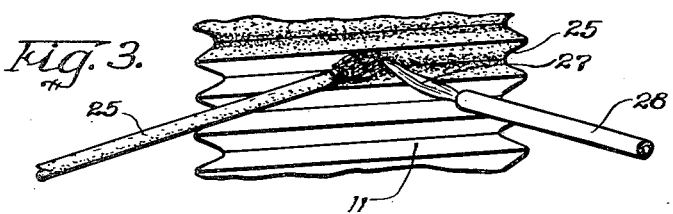
Inventor:
Joseph Skurka.
By Patented Aug. 31, 1954

2,687,975

UNITED STATES PATENT OFFICE 2,687,975

METHOD OF LUTING THREADS

Joseph Skurka, Niles, Ill., assignor to The Bastian-Blessing Company, Chicago, Ill., a corporation of Illinois Application March 15, 1949, Serial No. 81,453

13 Claims. (Cl. 117—37)

This invention relates generally to an improved method and apparatus for applying a soft metal luting material to threads for establishing a pressure tight sealed connection between conduit members.

This application is a continuation-in-part of an application for Luted Thread and Joint, Serial No. 557,079 filed October 4, 1944, by Joseph Skurka and William J. Zeher (now abandoned).

The present invention is primarily concerned with the luting of threads used to establish a seal between two conduit members so that fluids under pressure can be conducted between the conduit members without leakage. Most of the threads used in such connections are tapered or so-called pipe threads in which a surface of revolution including the crest, the pitch elements or the root of the thread defines a frusto-conical surface. These threads tend to wedge themselves as they are tightened and in wedging they are expected to provide a seal. If they do not, luting is resorted to. However, the crests and roots of the mating threads are not constant in production runs and the side walls do vary sufficiently that conventional luting practices such as dipping threads in molten metal baths or painting with luting compounds are inadequate.

In the present invention one of the mating threads of an expected connection is provided with a soft luting metal over a predetermined length thereof exclusive of the first one or two turns, with the luting metal securely bonded to the metal thread and being preferably distributed evenly along the thread being more concentrated at root of the thread from which location it flows into mating contour with the other thread by cold flow to fill all interstices as the threaded connection is tightened.

The invention is further characterized by a novel process for luting threads in which a soft solder is applied to a fluxed heated thread and a thin film of the soft solder covers the surface of the thread, the thickness of the metal gradually thinning from the root of the thread groove out along the sides of the thread to the crest, and the solder being actually bonded to the metal in which the thread is cut.

The present invention contemplates the process of luting female as well as male thread in which the thread is heated to the melting point of the solder, flux is applied, and under the puddling action of a hot stream of gases, the soft solder is brought into contact with the thread as the thread is simultaneously rotated and advanced axially with respect to the solder, whereby the molten metal induced by the capillary action of the thread groove having an included angle of 60° fills the root of the thread groove and distributes itself evenly along the length of the thread.

Another object of this invention is to provide an apparatus for rapidly and automatically heating, fluxing and luting selected portions of threads on identical articles as they are fabricated by mass production methods.

A further object is to provide a process by which the soft luting material may be permanently bonded to a thread in such manner as to resist chipping off, peeling or scaling as the thread is made up into a joint.

A further object is to provide an arrangement whereby the combined bonding action of a flux and the puddling action of a reducing gas flame is employed to form a superior bond between the luting alloy and the material of the thread.

Other objects and advantages of this invention will of course present themselves to those familiar with the art on reading the following specification in conjunction with the drawing and the appended claims.

In the drawing:

Fig. 1 is a plan view of a preferred form of apparatus for rapidly luting threads in accordance with the process of this invention;

Fig. 2 is an elevation showing the station at which the luting material is applied;

Fig. 3 is an enlarged elevation showing a portion of the thread as the luting material is applied;

Fig. 4 is a vertical section showing a portion of a thread after fluxing;

Fig. 5 is a vertical section showing a portion of the thread after the luting material has been applied;

Fig. 6 is a vertical section showing the luted thread as it is screwed into a mating thread;

Fig. 7 is an enlarged section showing a portion of a luted threaded connection; and Fig. 8 is a horizontal section of a portion of a female thread which has been luted according to the process of this invention.

The basic concept of this invention is to provide an apparatus in which threaded articles are heated to an elevated temperature, a liquid flux is applied to the thread surface particularly at the root, and lastly, a low melting point luting metal is brought into contact with the fluxed thread, preferably in the presence of a gas flame, which puddles the luting metal to bond it integrally to the thread. Obviously, the apparatus for performing this process may be any one of the great many different forms. A preferred embodiment, however, which has worked out quite well in practice is illustrated in Fig. 1.

The apparatus 10 is shown as set up for the luting of male threads 11 on valve bodies 12 which are fed into the apparatus through a chute 13. The apparatus 10 comprises a relatively large rotatable platform 14 which has a plurality of pivotally mounted turntables 15 thereon. Motion of the platform 14 is stepwise in the clockwise direction the platform turning 45° with each cycle. The small turntables 15 are driven by the same power drive means as is the platform 14 and they are geared in such manner that the smaller turntables 15 revolve continuously when the platform 14 is stationary and are stationary when the platform moves from station to station. This is readily accomplished by means of a planetary gear train and a brake for checking rotation of the turntables 15 when it is desired to move the platform 14.

Each of the turntables 15 is provided with a vertically movable spindle 16 for supporting a valve body 12 thereon. The lower ends of the spindles ride on a cam track 17 mounted beneath the platform 14, and thus, the position of each spindle 16 with respect to the turntable 15 is governed by the rotative position of that turntable with respect to the support for the platform 14. The cam track 17 is so shaped as to hold the spindles 16 in the elevated position at all stations except those adjacent the chutes 13 and 18. Thus, as the platform 14 rotates each spindle 16 rises upon its turntable 15 in order to pick up a valve body 12 off the end of the chute 13 and remains in the elevated position until the platform 14 has rotated 315° and then drops away to release the valve body 12 into the finish chute 18.

The first three stations through which the valve bodies 12 are carried are provided with gas burner nozzles 20 producing flames 21 which serve to heat the valve bodies 12 to required temperature. During the time which they are in the flames 21 the valve bodies 12 are constantly rotated so that the threads 11 are evenly heated. At the next station, indicated at 22, a liquid flux is sprayed on the heated thread 11 from a nozzle 23. The flux 21 is supplied from a tank (not shown) and may be gravity fed or sprayed on by aspirating or pumping. When the liquid flux comes in contact with the hot metal of the rotating thread 11 it spreads evenly to completely coat the thread 11 and protect it against oxidation as well as to reduce any oxide already formed. The thread now appears as shown in Fig. 4.

At the next station 24 soft solder in the form of a wire 25 is applied to the thread 11. The solder 25 is supplied from a coil 26 through a mechanism (not shown) which delivers it at constant speed against the thread 11. The angle of incidence of the solder 25 with respect to the thread 11 is somewhat less than perpendicular so that the solder wipes over the surface of the thread 11 rather than impinging directly on it. This wiping action aids greatly in the application, for neither slight eccentricity of the thread 11 as it rotates nor variation in the rate of solder feed affects the uniformity of the solder application.

Slightly beyond the point of application of the solder wire 25, a flame 27 from a burner 28 is directed against solder 25 which is partially melted by the heat of the valve body 12. This flame 27 exerts a puddling influence which drives the solder into the fluxed root of the thread 11 where it is integrally bonded to the brass of the valve body 12.

Although the process will work without the puddling flame 27, the applied solder is not nearly as well bonded to the thread and is less likely to penetrate to the bottom of the root.

The superior bond formed between the solder and the metal in which the thread is cut is believed to be the result of both the preliminary fluxing and the puddling of the solder immediately after it has been applied. When either step is missing it is quite difficult to produce a good bond and the luting tends to tear away when the thread is screwed into another.

In order to insure that the solder 25 will be evenly applied to the thread 11, the solder feed mechanism (not shown) and the nozzle 28 are moved downwardly as the valve body 12 is rotated. Thus, the solder 25 is applied first at the top of the thread and successively downwardly over its length. It is preferred to have the rate of downward movement be the same as the pitch of the thread so that the solder 25 and flame 27 actually follow the thread 11 downwardly as shown in Fig. 3. This results in a much more even application of the solder 25 and insures that the root is filled.

After the thread 11 has been coated with solder 25 the platform 14 rotates 45° and carries the valve body 12 to the next station 30 where the solder 25 solidifies as the body 12 cools in air.

At the next station the spindle 16 drops away and permits the valve body 12 to be carried into the chute 18 which may lead to a wash tank where a water bath removes all traces of excess flux etc. Final cooling also occurs during washing.

As a luting metal I prefer to employ a soft solder having a composition of approximately 50% lead and 50% tin. Solders having a higher tin content are satisfactory but the additional expense involved is usually unwarranted. Solders having high antimony content should be avoided when brass, bronze or copper threads are to be luted, for the antimony forms complexes with copper and zinc which are difficult to fuse resulting in poor flow and puddling.

Flux cored wire solder may be employed but it is not recommended, for the flux does not get into the root of the thread nearly as well as when it is applied prior to the solder.

As a flux it is preferred to employ a solution of zinc chloride and ammonium chloride in water to which glycerine has been added. The glycerine improves the wetting properties of the solution. The chlorides are preferably present in such a ratio as to be approximately 70% zinc chloride and 30% ammonium chloride which produces a low fusing eutectic mixture.

The actual concentration of the solution may be varied according to the solder used and the temperature of the parts it being desirable to use as little flux as possible or a more dilute flux, for the problem of removal of excess flux is simplified.

Another flux which has proved successful is simply a dilute solution of hydrochloric acid in water and glycerine. Similarly, many other conventional fluxes may be employed and the choice of which flux to use is best determined by trial and error.

Paste or solid fluxes, however, are difficult to apply, and in many cases they do not get down into the root of the thread with the result that the solder is not bonded to the base metal at the root. Hence, it is preferred to employ liquid fluxes which may be sprayed or flowed onto the threads.

It is preferred to heat the articles only to a temperature at which the solder will melt and flow freely which temperature is around 400°–450° F. when a 50% lead–50% tin solder is used. The use of the puddling flame 27 after the solder 25 has been applied makes it possible to use a slightly lower temperature, for in addition to its puddling action it prevents cooling of the solder on the outside before the inner solder has worked into the root. In no case should the temperature be allowed to rise above 750° F., for brittle copper-tin compounds form in this range and destroy the effectiveness of the luting.

Although the apparatus and method of this invention has been described in connection with a single apparatus for luting a thread on a certain article, it will be apparent to those familiar with the art that the apparatus may be readily modified to handle other types of articles and threads, such as the coupling 31 shown in Fig. 7, and that the process may be carried out by different types of apparatus from that described.

Accordingly, various changes and modifications such as will present themselves to those familiar with the art may be made without departing from the spirit of this invention whose scope is commensurate with the following claims.

What is claimed is:

1. A process for preluting threads on an article formed of brass including rotating the article about a vertical axis, heating the threaded portion of the article to a temperature of approximately 425° F., spraying a liquid flux comprising an aqueous solution of a chloride and glycerine on the heated thread, moving a wire of soft solder having a tin content of approximately 55 percent into contact with the thread at the lowermost point of the luted area while the thread is rotating, the solder wire being moved in an axial direction along the thread to increase the luted area to follow the thread, and simultaneously playing a gas flame on the solder and thread to puddle the solder and cause same to fill the root of the thread and become homogeneously bonded to the brass and thin out toward the crest of the thread by the capillary action of the heated diverging side walls of the thread groove.

2. A process for preluting threads on an article formed of brass with a soft solder including heating the threaded portions of the article to a temperature above the melting range of the solder, spraying a liquid flux solution on the heated thread, moving a wire of soft solder having a tin content of at least 50 percent into contact at an acute angle with the thread while the thread is rotating about an upright axis, the solder being moved axially along the thread to follow the thread, and simultaneously playing a flame on the solder and thread to puddle the solder and cause same to fill the root of the thread, inducing the molten metal to thin out toward the crest of the thread by the capillary action of the heated diverging side walls of the thread groove.

3. A process for preluting threads on articles formed of brass including heating the threaded portions of the article to a temperature above 400° F., spraying a liquid flux solution containing glycerine on the heated thread, moving a wire of soft solder into the contact with the thread while the thread is rotating about an upright axis, the solder being lowered axially along the thread to follow the thread, and simultaneously playing a flame on the solder and thread to puddle and drive the solder into the root of the thread to cause same to fill the root of the thread and thin out toward the crest of the thread by the capillary action of the heated diverging side walls of the thread groove.

4. A process for preluting threads on a metal article with soft solder comprising rotating the threaded portion about the axis of the threads with the axis disposed vertically and with the direction of rotation such that the groove of the thread moves downwardly, heating the threaded portion of the article to a temperature in the neighborhood of the flowing temperature of the solder, applying a flux to the heated article, progressively feeding a wire of solder into wiping contact with the thread at an acute angle to the surface thereof starting at a point near the top thereof and progressively moving the wire and threaded portion with respect to each other at a rate of movement to maintain the wire in contact in the groove of the thread and simultaneously with said feed playing a flame on the deposited solder to melt and drive same into the root of the thread groove, inducing the molten solder to fill the root of the thread to a predetermined depth and thin out toward the crest of the thread by the capillary action of the diverging side walls of the thread groove, and allowing the article and solder to cool.

5. A process for preluting threads on a metal article with soft solder comprising heating the threaded portion of the article to a temperature in the neighborhood of the flowing temperature of the solder, supporting the article in such position that the axis of the thread thereon is substantially vertical, rotating said threaded portion about the axis of the thread in a direction in which the helix of the thread progresses downwardly, moving the end of a wire of solder into contact with the thread at a point near the top thereof and progressively lowering the wire as the article is slowly rotated, the rate of downward movement of the solder being correlated to the speed of thread rotation and such that the end of the wire follows the thread helix downwardly, the wire of solder being simultaneously advanced toward the thread to deposit same on the thread, playing a flame on the deposited solder to melt and drive same into the root of the thread during said rotation, inducing the molten solder to fill the root of the thread to a predetermined depth and thin out toward the crest of the thread by the capillary action of the heated diverging side walls of the thread groove, and allowing the article and solder to cool to the solidifying temperature of the solder.

6. The process of luting a thread including rotating a threaded member about a vertical axis coincident with the axis of the thread, heating the thread to the melting point of solder, progressively bringing a wire of solder into contact with the thread and moving the end of the wire along with the lead of the thread during rotation while simultaneously impinging a flame on the wire and thread to melt the solder as it contacts the thread and to drive the molten solder into the root of the thread during rotation, and inducing the molten solder to fill the root of the thread to a predetermined depth and thin out toward the crest of the thread by the capillary action of the heated diverging side walls of the thread groove.

7. The process of luting a threaded member including rotating the member and a wire of solder with respect to each other about the axis of the thread disposed vertically while advancing the wire toward the thread and moving the wire along with the lead of the thread, progressively melting the solder and driving it into the root of the thread under the puddling influence of a flame to bond the solder to the thread, and inducing the molten solder to fill the root of the thread to a predetermined depth and thin out along the side walls of the thread toward the crest of the thread by the capillary action of the heated diverging side walls of the thread groove.

8. The process of luting a threaded member including rotating about a vertical axis a quantity of solder relative to a member heated to the melting point of the solder, progressively melting the solder in contact with the member at a point of contact under gas flame, inducing the molten solder to fill the root of the thread to a predetermined depth and thin out toward the crest of the thread by the capillary action of the heated diverging side walls of the thread groove, and moving the parts axially with respect to each other to move the point of contact along the relative lead of the thread during said relative rotation.

9. The process of luting a threaded member including rotating relative to each other about a vertical axis a quantity of solder and a member heated to the melting point of the solder, wiping the solder on the thread by directing and feeding the wire of solder lengthwise against the thread at an acute angle at the area of contact, melting and driving the molten solder by a puddling flame into the root of the thread, inducing the molten solder to fill the root of the thread to a predetermined depth and thin out toward the crest of the thread by the capillary action of the heated diverging side walls of the thread groove, and moving the solder and member axially with respect to each other to advance the solder from an upper point of contact to follow the lead of the thread downwardly in relationship to the relative direction of rotation.

10. The process of luting a thread comprising heating the metal body having the thread thereon to an elevated temperature, subsequently spraying a liquid flux on said thread to reduce oxides formed thereon and prevent the later formation of oxides, wiping the solder on the thread while the axis of the thread is disposed vertically by directing and progressively feeding solder wire lengthwise against the thread at an acute angle to the surface thereof along the thread, melting and driving the molten solder by a puddling flame into the fluxed root of the thread where the wire and thread contact, inducing the molten solder to fill the root of the thread to a predetermined depth and thin out toward the crest of the thread by the capillary action of the heated diverging side walls of the thread groove.

11. The process of luting a thread comprising heating the metal in which the thread is brought to an elevated temperature, subsequently applying flux to said thread to reduce oxides formed thereon and prevent the later formation of oxides, thereafter bringing a soft solder in contact with the thread with the axis of the thread disposed vertically, melting the solder at the point of contact, driving the solder by a puddling flame into the fluxed root of the thread to be integrally bonded to the metal thereof, and inducing the molten solder to fill the root of the thread to a predetermined depth and thin out toward the crest of the thread by the capillary action of the heated diverging side walls of the thread groove.

12. A process for preluting threads on an article formed of brass including heating the threaded portions of the article to a temperature of at least 400° F., spraying a liquid flux comprising an aqueous solution of a chloride and glycerine on the heated thread and moving a wire of soft solder having a tin content of at least 50 percent into contact with the thread while the thread is rotating with its axis disposed vertically, the solder being moved axially along the thread to follow the thread, melting and driving the molten solder into the fluxed root of the thread and inducing the molten solder to fill the root of the thread to a predetermined depth and thin out toward the crest of the thread by the capillary action of the heated diverging side walls of the thread groove defining an included angle of 60°.

13. A process for preluting threads on a metal article with soft solder comprising heating the threaded portion of the article to a temperature in the neighborhood of the flowing temperature of the solder, supporting the article in such position that the axis of the thread thereon is substantially vertical, rotating the threaded portion about said axis, moving the end of a wire of solder into contact with the thread at a point near one end thereof and progressively moving the wire along the thread towards the other end as the article is slowly rotated, the rate of movement of the wire being such that its end follows the helix of the thread, and the wire of solder being simultaneously advanced toward the thread to deposit same on the thread, melting and driving the solder into the root of the thread, and inducing the molten solder to fill the root of the thread to a predetermined depth and thin out toward the crest of the thread by the capillary action of the heated diverging side walls of the thread grooves.

References Cited in the file of this patent

UNITED STATES PATENTS

| Number | Name | Date |
| --- | --- | --- |
| 2,277,654 | Merlub-Sobel | Mar. 24, 1942 |
| 2,288,869 | Wassermann | July 7, 1942 |
| 2,295,702 | Wissler | Sept. 15, 1942 |
| 2,301,763 | Wagner | Nov. 10, 1942 |
| 2,304,859 | Strickland | Dec. 15, 1942 |
| 2,316,959 | Hinkley | Apr. 20, 1943 |
| 2,431,781 | Wagner | Dec. 2, 1947 |
| 2,510,463 | Danziger | June 6, 1950 |